(12) United States Patent
Brindza et al.

(10) Patent No.: US 9,440,882 B1
(45) Date of Patent: Sep. 13, 2016

(54) LIGHTWEIGHT CONCRETE WITH ENHANCED NEUTRON SHIELDING

(75) Inventors: Paul Daniel Brindza, Yorktown, VA (US); Bert Clayton Metzger, Seaford, VA (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 797 days.

(21) Appl. No.: 13/068,619

(22) Filed: May 16, 2011

(51) Int. Cl.
*C04B 16/04* (2006.01)
*C04B 24/28* (2006.01)
*C08K 3/20* (2006.01)
*C08L 67/03* (2006.01)
*C08K 3/18* (2006.01)

(52) U.S. Cl.
CPC .............. *C04B 16/04* (2013.01); *C04B 24/283* (2013.01); *C08K 3/18* (2013.01); *C08K 3/20* (2013.01); *C08L 67/03* (2013.01)

(58) Field of Classification Search
CPC ..... C04B 16/04; C04B 24/283; C08L 67/03; C08K 3/18; C08K 3/20
USPC ............................................................. 524/4
See application file for complete search history.

(56) References Cited

U.S. PATENT DOCUMENTS

| 4,123,392 | A | * | 10/1978 | Hall et al. .................... 252/478 |
| 5,501,819 | A | * | 3/1996 | Westhof et al. ............... 252/503 |
| 7,396,403 | B1 | * | 7/2008 | Ogden .......................... 106/810 |
| 2005/0084334 | A1 | * | 4/2005 | Shi et al. ................... 405/129.9 |

OTHER PUBLICATIONS

Micron3 Product Sheet. Aug. 2003.*

* cited by examiner

*Primary Examiner* — John Uselding

(57) ABSTRACT

A lightweight concrete containing polyethylene terephthalate in an amount of 20% by total volume. The concrete is enriched with hydrogen and is therefore highly effective at thermalizing neutrons. The concrete can be used independently or as a component of an advanced neutron radiation shielding system.

3 Claims, No Drawings

LIGHTWEIGHT CONCRETE WITH ENHANCED NEUTRON SHIELDING

The United States of America may have certain rights to this invention under Management and Operating Contract No. DE-AC05-84ER 40150 from the Department of Energy.

FIELD OF THE INVENTION

The present invention relates to a composition of concrete, and a method of making same, incorporating polyethylene terephthalate to be used in neutron shielding applications.

BACKGROUND OF THE INVENTION

Neutron radiation may be generated as a result of a variety of nuclear reactions or interactions. More specifically, devices such as particle accelerators and nuclear reactors may emit neutrons during operation. Neutrons have a deleterious effect on both living matter and inanimate objects. Neutrons may also participate in neutron activation, thereby inducing radioactivity in environmental materials, equipment, and structures.

It is of vital importance, therefore, to provide adequate shielding from any sources of neutron radiation. Various methods and devices are known to be capable of providing such shielding. One such method involves the use of materials having a high hydrogen content. It is desirable to convert fast neutrons to thermal neutrons for purposes of shielding, as the thermal neutrons can be further attenuated by other shielding materials or methods. Materials with embedded hydrogen are known to effectively thermalize fast neutrons to thermal neutrons.

Hydrogen-enhanced concrete, therefore, can be used to assist in neutron radiation shielding in a variety of applications. Concrete shielding can be incorporated into the structure of a building, room, or any portion thereof. When utilizing such material in construction, the concrete must be of sufficient strength to satisfy the structural requirements of the building elements. Further, such material needs to have the same pourability and workability characteristics as found in traditional concrete formulations.

Accordingly, it is desirable to have a lightweight and structurally sound concrete which is enriched with hydrogen and is able to provide effective neutron shielding, either independently or as part of an advanced neutron shielding system.

OBJECT OF THE INVENTION

It is an object of the invention to provide a concrete composition and a method of making same which can be used as an effective but low-cost neutron shield, and, further, possess sufficient compressive strength and other such characteristics for a variety of building and construction applications.

SUMMARY OF THE INVENTION

The present invention describes a concrete composition incorporating plastic which can be used as a thermal neutron shield. Plastic, in the form of polyethylene terephthalate, is added to the concrete mixture in place of a portion of the traditional ingredient of sand. In a preferred embodiment of the invention, the hydrogen content of the concrete mix is four percent (4%) hydrogen by volume. The concrete composition and method for making same provides efficient and inexpensive shielding for neutrons that also serves as an excellent structural building material.

DETAILED DESCRIPTION

Various types and methods of neutron radiation shielding are known in the art. It is recognized that materials with a high hydrogen content are able to provide effective neutron attenuation.

The mass of the nucleus of a hydrogen atom is essentially the same as that of a neutron. Therefore, neutrons will progressively lose speed and, commensurately, energy after repeated collisions with hydrogen atoms in a shielding substance. This characteristic of hydrogen to effectively thermalize neutrons via scattering makes it ideal for applications involving neutron shielding. A cost-effective method of shielding thermal neutrons can therefore be realized by making hydrogen-enriched concrete.

As set forth herein, plastic can be substituted for a portion of the sand found in ordinary concrete in order to make a hydrogen-rich concrete suitable for shielding thermal neutrons. The enriched concrete mixture includes a high hydrogen content while still maintaining high strength. Further, such concrete possesses excellent workability properties.

Plastic, in the form of polyethylene terephthalate is added to the concrete mixture in place of sand. In a preferred embodiment, recycled PET plastic is used. This type of plastic is generally hard, making it more structurally sound in the finished concrete. The size of the plastic pieces in the mixture may vary but the pieces are generally rough with jagged edges. A 4 mesh screen is used to insure that the size of any particular plastic piece does not exceed 0.187 inches (4.75 mm). In a preferred embodiment, the lightweight concrete is composed of essentially twenty percent (20%) PET plastic by volume.

It will be noted that the concrete may be prepared by using plastic other than recycled PET plastic, such as fresh, extruded plastic. The preferred embodiment, however, relies upon recycled PET plastic as that type provides sufficient structural strength while significantly reducing the overall cost of the mixture.

Gravel is a staple component of ordinary concrete. In order to further reduce the weight of the finished concrete, shale may be used in place of gravel in the instant composition. It is recognized in the art that the replacement of gravel with shale will reduce the final weight of concrete. Nonetheless, the replacement of both gravel and sand, with plastic and shale, as disclosed herein, yields an even lighter weight finished concrete.

Table A illustrates the mix quantities to produce one cubic yard of the preferred embodiment of the concrete disclosed herein:

TABLE A

| Material | Quantity to Produce One Cubic Yard of Concrete | Volume |
| --- | --- | --- |
| Portland cement (lbs) | 564 | 2.869 |
| Fly ash (lbs) | 141 | 0.922 |
| Micron3 (oz) | 50 | 0.315 |
| Plastic (lbs) | 290 | 5.404 |
| ¾" course aggregate (e.g., Solite)(lbs) | 492 | 5.222 |
| Fine aggregate (sand)(lbs) | 1179 | 7.187 |
| Water (gallons) | 33 | 4.405 |
| Plastocrete (oz) | 5.0 per 100 lbs of concrete | |

TABLE A-continued

| Material | Quantity to Produce One Cubic Yard of Concrete | Volume |
|---|---|---|
| Viscocrete (oz) | 2.5 per 100 lbs of concrete | |
| Total Cementitious Material (lbs) | 7.55 | |
| Water/Cementitious Ratio | 0.36 | |
| Air Content (percent) | 0 | |

Aside from the addition and/or removal of specific components, as detailed herein, the lightweight concrete is produced by combining, mixing, pouring, and curing as one would with traditional large batch concrete compositions: (1) combine approximately 60% of the water with the viscosity additives, (2) add the various aggregates, including plastic, and mix thoroughly, and (3) introduce the cement and continue to mix while adding the balance of the water.

The structural strength of the concrete composition is comparable to ordinary concrete while being essentially seventy percent (70%) of the weight of ordinary concrete. Specifically, the structural strength of the instant concrete is equal to 4,000 psi or greater while the instant concrete has a unit weight in the range of 110-115 pounds per cubic foot, compared to 150 pounds per cubic foot for ordinary concrete.

The instant concrete is further composed of essentially four percent (4%) hydrogen by volume as compared to one percent (1%) by volume for ordinary concrete. This hydrogen enhancement makes it three times more efficient at thermalizing neutrons than ordinary concrete.

The lightweight, hydrogen-enriched concrete has potential shielding applications in the nuclear power industry, in high-energy particle and nuclear physics labs, and any industry or location where neutrons are present. The fact that this type of shielding can be integrated into the building structure further serves to reduce overall costs and the necessary footprint for adequate levels of neutron shielding.

While the invention has been described in reference to certain preferred embodiments, it will be readily apparent to one of ordinary skill in the art that certain modifications or variations may be made to the composition and method without departing from the scope of invention described in the foregoing specification.

The invention claimed is:

1. A lightweight concrete with neutron shielding, said concrete comprising:
    a) portland cement;
    b) fly ash;
    c) essentially 51% polyethylene terephthalate by weight relative to the weight of the cement component of the mixture;
    d) coarse aggregate;
    e) sand; and
    f) water.

2. A lightweight concrete with neutron shielding comprising:
    20% polyethylene terephthalate plastic by volume; and
    a hydrogen content of 4% by volume.

3. The lightweight concrete of claim 2 wherein said concrete further comprises a unit weight in the range of 110-115 pounds per cubic foot.

* * * * *